March 7, 1933.  B. C. YOUMAN  1,900,267
FISH AUGER
Filed March 1, 1930
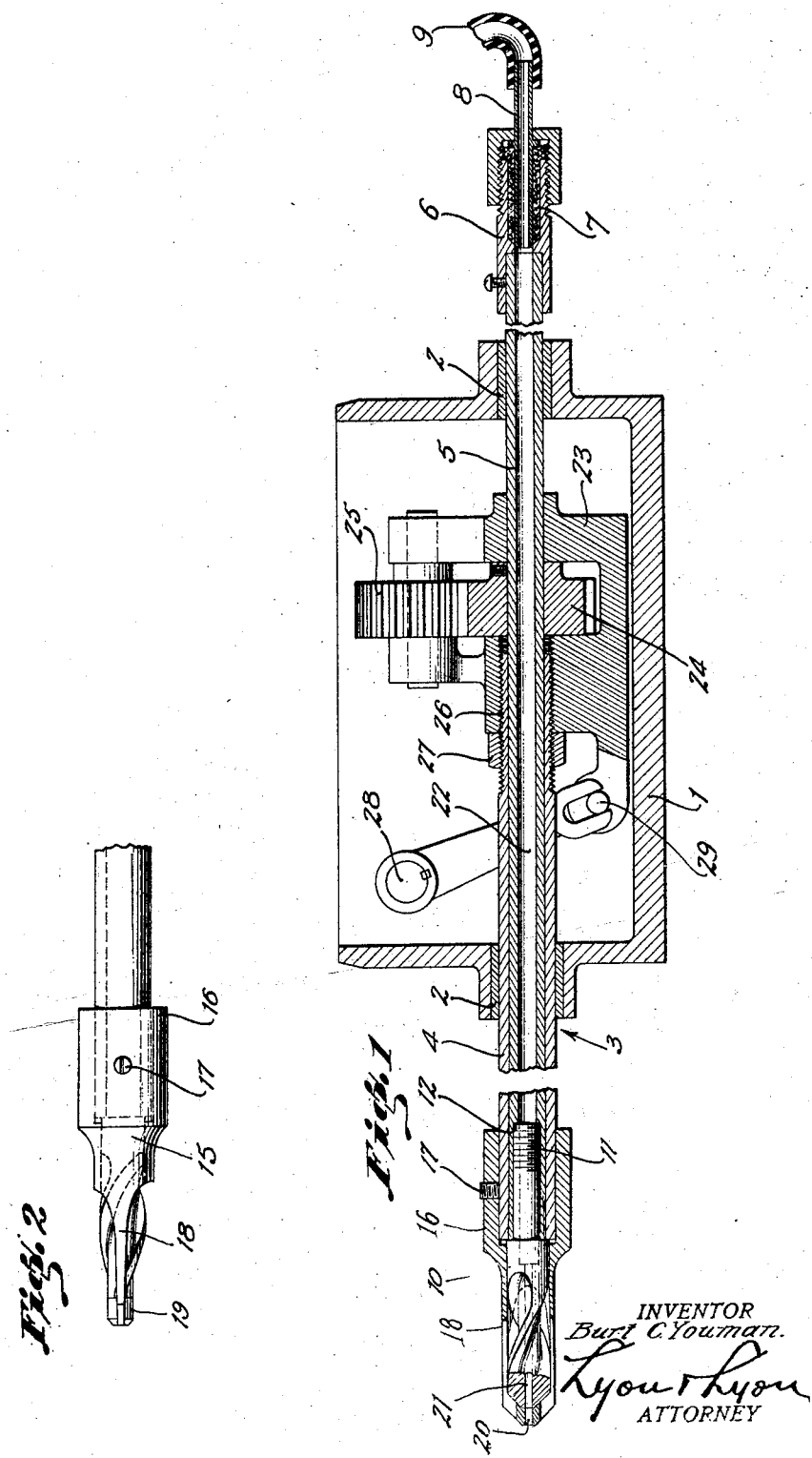
INVENTOR
Burt C. Youman.
Lyon & Lyon
ATTORNEY Patented Mar. 7, 1933

1,900,267

UNITED STATES PATENT OFFICE

BURT C. YOUMAN, OF SAN FRANCISCO, CALIFORNIA, ASSIGNOR TO CALIFORNIA PACKING CORPORATION, OF SAN FRANCISCO, CALIFORNIA, A CORPORATION OF NEW YORK

FISH AUGER

Application filed March 1, 1930. Serial No. 432,480.

This invention relates to fish augers such as employed for withdrawing the viscera of the fish. In the operation of these devices, the body of the fish is held in alignment with a spindle carrying a rotary head and while so positioned, the spindle is reciprocated and rotated. In its forward travel it passes longitudinally into the fish's body and in its rotation entangles the viscera of the fish so that it withdraws the viscera in its return movement.

The general object of this invention is to provide an improved construction for such an auger which will operate effectively to perform its functions; also to provide an auger of this type which is adapted to be employed with irrigating means for spraying and rinsing the body of the fish as the auger operates.

Further objects of the invention will appear hereinafter.

The invention consists of novel parts and combination of parts to be described hereinafter, all of which contribute to produce an efficient fish auger.

A preferred embodiment of the invention is described in the following specification, while the broad scope of the invention is pointed out in the appended claims.

In the drawing:

Figure 1 is a longitudinal section through a portion of the casing of a fish cleaning machine and illustrating my auger construction mounted in the same, certain parts being broken away.

Figure 2 is a plan of the rotary head of the auger and contiguous parts, the spindle being represented as broken away.

Before proceeding to a detailed description of this improvement it should be understood that these augers are employed principally in connection with automatic fish cleaning machines in which the fishes' bodies are carried on an endless conveyor that advances with a step-by-step movement so that the fishes' bodies are presented in longitudinal alignment with the spindle of the auger, or augers.

While the fish body is held in alignment with the spindle in this way, the spindle advances into the fish's body lengthwise and the rotation of the rotary head at the forward end of the spindle entangles the viscera of the fish and withdraws the same on the return movement of the spindle.

Referring more particularly to the parts, 1 represents a casing which is a fixed part of a fish cleaning machine such as referred to above, said casing having bushed openings 2 operating to guide a longitudinally reciprocating spindle 3, said spindle comprising a tubular outer shaft or spindle 4 and an inner shaft 5. This inner shaft constitutes the rear end of the spindle and it is preferably tubular and provided at its rear end with a swivel connection 6 including a stuffing box 7 beyond which a nipple 8 projecting from the stuffing box connects to the end of a flexible hose 9 to supply flushing water to the auger.

The auger comprises a rotary head 10 which is formed at its inner end with a tang 11 that is threaded tightly into a counterbore 12 at the end of the inner shaft 5, so that when this shaft is rotated the rotary head 10 will also rotate.

The body of the rotary head 10 has means for engaging the viscera of the fish. Any suitable means may be employed for this purpose. This is preferably accomplished by giving the body 10 the form of a screw or auger, the helix of said screw being of high pitch. This auger is preferably a straight rod of uniform diameter with a helical groove cut in its side face. The groove is inclined on its forward face and abrupt on its rear face. This form for the screw enables the same to penetrate readily into the fish's body and effectively withdraw the viscera.

I provide means to cooperate with the rotary head 10 to increase its efficiency. This means preferably consists of a relatively fixed cap member 15 having a collar 16 at one end rigidly secured to the end of the outer shaft or spindle 4 by any suitable means such as a set screw 17. The cap member 15 is provided with means extending alongside of the rotary head to cooperate with it in entangling the viscera. This means preferably consists of a plurality of bars 18 which in the present instances are two in number.

These bars are located with their axes displaced laterally with respect to the axis of the spindle, are located diametrically opposite to each other and are connected together integrally by a tip 19 that forms a seat for the end of the rotary head. If the auger is to be used with flushing water, the tip 19 is formed with a central opening 20 to register with a water duct 21 which terminates the auger and operates as an extension of the main duct or bore 22 that extends through the interior of the spindle and carries the water to the rotary head from the hose 9. If desired, water may be supplied to the auger through a water box such as described in my Patent No. 1,853,328.

In order to reciprocate the spindle 3 it is attached to a reciprocating bracket or crosshead 23. The inner spindle or inner shaft is rotatably mounted in this cross-head and is rotated through the medium of a pinion 24 rigidly secured to the inner shaft and rotated by mechanism of the machine through the medium of a driving pinion 25.

The outer shaft or outer spindle 4 is relatively fixed, that is to say, it does not rotate but is adjustably mounted in the cross-head 23 by means of a thread connection 26. At this point a lock nut 27 may be provided to lock the spindle 4 in any adjusted position to suit the position of the rotary head.

The cross head 23 is reciprocated by means of a rock shaft 28 having a forked arm engaging the pin 29 on the cross-head.

If desired, the rotary head 10 may be provided at suitable points with small outlet ports 30 through which the flushing water may escape into the fish's body while the auger is in operation.

It is understood that the embodiment of the invention described herein is only one of the many embodiments this invention may take, and I do not wish to be limited in the practice of the invention, nor in the claims, to the particular embodiment set forth.

What I claim is:

1. A fish auger for cleaning fish comprising in combination, a spindle adapted to be reciprocated longitudinally to enter the fish's body lengthwise and withdraw from the same, a rotary head carried at the end of the spindle, in the form of a screw having a helix with an inclined forward face and an abrupt rear face for engaging the viscera of the fish as the head rotates, and a relatively fixed cap-member having a plurality of bars extending longitudinally alongside of the rotary-head and cooperating with the same to entangle the viscera of the fish.

2. A fish auger for cleaning fish, comprising in combination, a tubular spindle adapted to be reciprocated longitudinally to enter the fish's body lengthwise and withdraw from the fish, means for holding the same against rotation, an inner shaft mounted within the spindle, a rotary head attached to the end of the inner shaft having means for engaging the viscera of the fish as the head rotates, and a relatively fixed cap attached to the end of the tubular spindle to cooperate with the rotary head to entangle the viscera of the fish, said cap and said rotary head having cooperating water ducts therethrough for delivering water beyond the end of the cap.

3. A fish auger for cleaning fish, comprising in combination, a tubular spindle adapted to be reciprocated longitudinally to enter the fish's body lengthwise and withdraw from the fish, means for holding the same against rotation, an inner shaft mounted within the spindle, a rotary head having engaging means for engaging the viscera of the fish as the head rotates, and a cap-member having a collar at one end for attaching the same to the tubular spindle, and having a plurality of longitudinally extending bars lying alongside of the rotary head and cooperating with the same to entangle the viscera of the fish.

Signed at San Francisco, California, this 22nd day of January 1930.

BURT C. YOUMAN.